(12) United States Patent
Hayden

(10) Patent No.: US 7,252,083 B2
(45) Date of Patent: Aug. 7, 2007

(54) STRUCTURE FOR SUPPORTING ENERGY CONVERSION MODULES AND SOLAR ENERGY COLLECTION SYSTEM

(75) Inventor: Herbert T. Hayden, Tempe, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 0 days.

(21) Appl. No.: 11/184,661

(22) Filed: Jul. 18, 2005

(65) Prior Publication Data

US 2007/0012312 A1   Jan. 18, 2007

(51) Int. Cl.
*F24J 2/38* (2006.01)
*F24J 2/16* (2006.01)

(52) U.S. Cl. .................. 126/600; 126/605; 126/687; 248/127

(58) Field of Classification Search ............ 126/600, 126/605, 687; 248/127, 146, 158; 136/244
See application file for complete search history.

(56) References Cited

U.S. PATENT DOCUMENTS

| | | | |
|---|---|---|---|
| 3,996,917 A | 12/1976 | Trihey | |
| 4,056,309 A | 11/1977 | Harbison et al. | |
| 4,056,313 A | 11/1977 | Arbogast | |
| 4,108,154 A | 8/1978 | Nelson | |
| 4,109,638 A | 8/1978 | Matlock et al. | |
| 4,110,009 A | 8/1978 | Bunch | |
| 4,137,897 A | 2/1979 | Moore | |
| 4,146,785 A | 3/1979 | Neale | |
| 4,203,426 A | 5/1980 | Matlock et al. | |
| 4,317,031 A | 2/1982 | Findell | |
| RE30,960 E | 6/1982 | Sommer | |
| 4,466,423 A | 8/1984 | Dolan et al. | |
| 4,832,001 A | 5/1989 | Baer | |
| 4,966,631 A * | 10/1990 | Matlin et al. ............... | 136/244 |

(Continued)

FOREIGN PATENT DOCUMENTS

GB       2155615 A       9/1985

OTHER PUBLICATIONS 3 photographs of a solar system installed over a parking lot at the Cal Expo grounds in Sacramento, CA, believed to have built around 2000.

(Continued)

*Primary Examiner*—Alfred Basichas
(74) *Attorney, Agent, or Firm*—Meschkow & Gresham, P.L.C.

(57) ABSTRACT

A structure (26) for supporting an array (22) of solar panels (24) in a solar energy collection system (20) includes a support assembly (42) formed from a rigid subassembly (44). The subassembly (44) includes an elongated truss (68), a base (46) coupled to the truss (68) for attachment to a footing (48), and posts (50) extending from a top edge of the truss (68). The structure (26) further includes torsion tubes (34), each of which is pivotally retained by one of the posts (50) to form parallel rows (32) of torsion tubes (34). A number of rigid subassemblies (44) can be interconnected to further increase the number of rows (32) of the system (20). The solar panels (24) are attached to the torsion tubes (34) to form the array (22), and a drive mechanism (38) pivots the torsion tubes (34) via a single elongated actuator and multiple torque arms (90).

19 Claims, 7 Drawing Sheets

U.S. PATENT DOCUMENTS

| | | |
|---|---|---|
| 4,995,377 A | 2/1991 | Eiden |
| 5,022,929 A | 6/1991 | Gallois-Montbrun |
| 5,143,556 A * | 9/1992 | Matlin ........................ 136/244 |
| 5,228,924 A | 7/1993 | Barker et al. |
| 5,542,409 A * | 8/1996 | Sampayo .................... 126/606 |
| 6,058,930 A * | 5/2000 | Shingleton .................. 126/600 |
| 6,089,224 A | 7/2000 | Poulek |
| 6,294,725 B1 | 9/2001 | Hirschberg et al. |
| 6,722,357 B2 | 4/2004 | Shingleton |
| 2004/0238025 A1 | 12/2004 | Shingleton |
| 2005/0109385 A1 | 5/2005 | Shingleton et al. |

OTHER PUBLICATIONS 8 photographs of a solar system installed near Davis, CA, built by Integrated Power Corp, and believed to have been built around 1989.

2 photographs of a solar system built for Arizona Public Service Company in Tempe, AZ. by UPG in the mid-late 1990's.

* cited by examiner

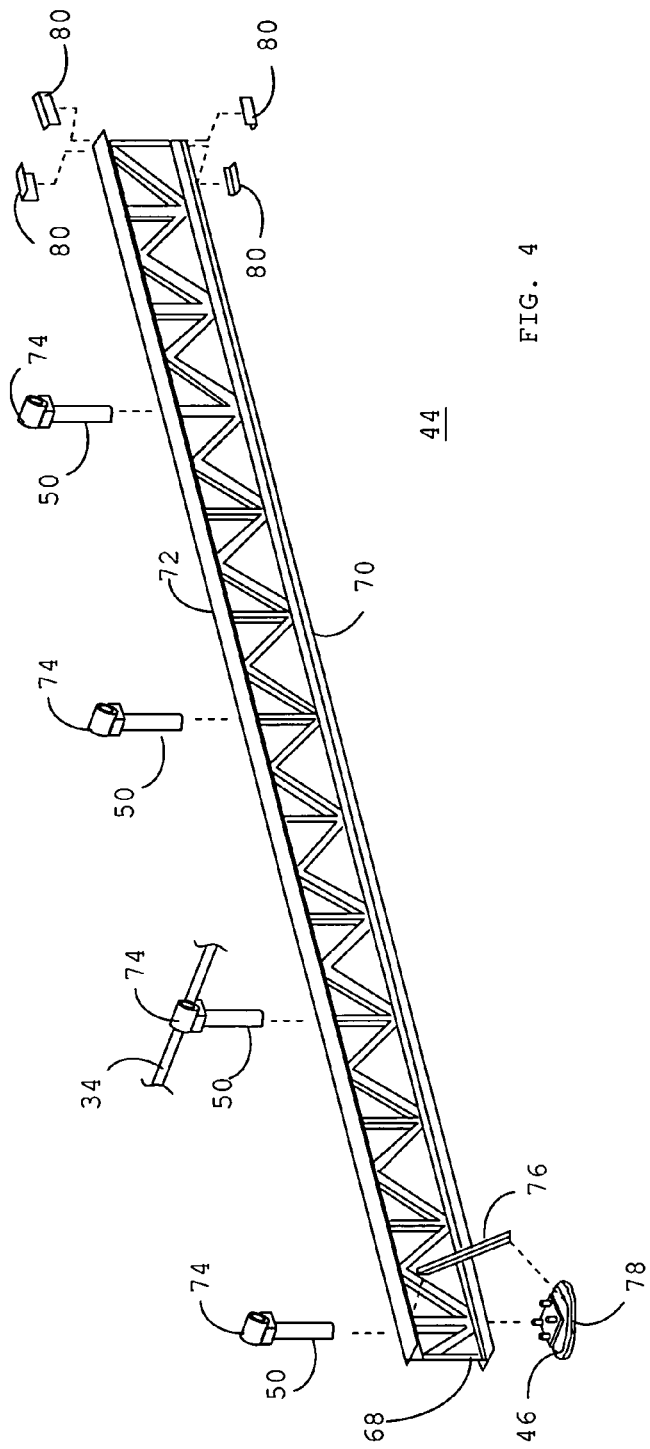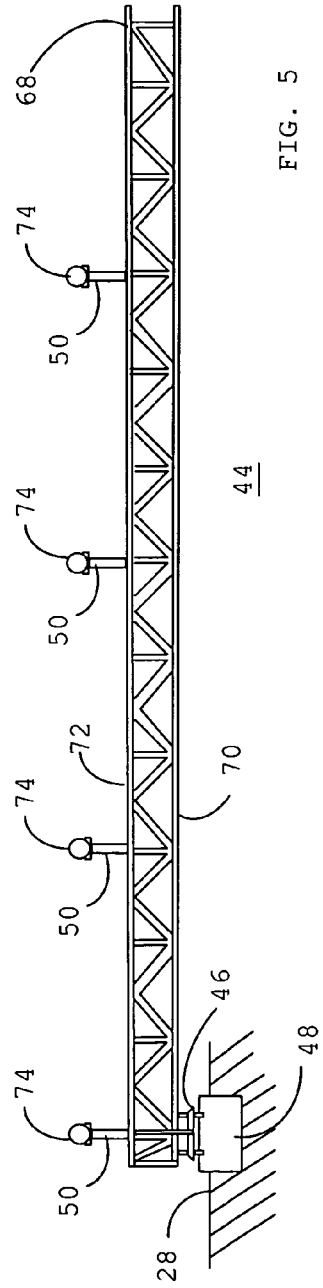

STRUCTURE FOR SUPPORTING ENERGY CONVERSION MODULES AND SOLAR ENERGY COLLECTION SYSTEM

TECHNICAL FIELD OF THE INVENTION

The present invention relates to the field of solar energy collection systems. More specifically, the present invention relates to a structure for supporting an array of solar energy conversion modules.

BACKGROUND OF THE INVENTION

Due to the finite supply of fossil energy sources, the global environmental damage caused by fossil fuels, increasing energy demand, and economic forces, society is becoming compelled to diversify energy resources. One such technology that has received significant attention is the use of solar energy.

Solar energy collection systems are used for a variety of purposes, for example, as utility interactive power systems, power supplies for remote or unmanned sites, and cellular phone switch-site power supplies. An array of energy conversion modules, such as, photovoltaic (PV) modules, in a solar energy collection system can have a capacity from a few kilowatts to a hundred kilowatts or more, depending upon the number of PV modules, also known as solar panels, used to form the array. The solar panels can be installed wherever there is exposure to the sun for significant portions of the day.

In general terms, a solar energy collection system includes an array of solar panels arranged in the form of rows and mounted on a support structure. The solar panels are oriented to optimize the solar panel energy output to suit the particular solar energy collection system design requirements. Solar panels may be mounted on a fixed structure, with a fixed orientation and fixed tilt, or may be mounted on a tracking structure that aims the solar panels toward the sun as the sun moves across the sky during the day and as the sun path moves in the sky during the year. Tracking the sun can lead to a significant increase in annual radiation falling on the tracked surface, thus an increase in efficiency, relative to a fixed structure.

Significant technological progress has been achieved in the design and production of solar panels, accompanied by increased efficiency and reductions in manufacturing cost. Another a major cost element involved in the establishment of a wide-scale solar energy collection system is the cost of the support structure used to mount the solar panels of the array in proper position for receiving and converting solar energy.

Many different support structures for solar panels have been proposed and implemented. Unfortunately, many of these support structures are so costly and mechanically complicated that they have hindered the widespread introduction of solar arrays for the generation of commercial and industrial electricity. In addition to the mechanical complexity of such support structures, costs are also largely influenced by the number and size of the footings to which the support structure is fastened. The cost of footings is governed by labor costs, soil conditions, and site preparation costs, as well as the cost and availability of concrete.

A shortage of cement, the basic ingredient for concrete, has been exacerbated by a continued housing boom and import constraints, and has resulted in significant increases in the cost of cement. The shortage of cement afflicts many regions, and is particularly problematic in the United States across the sunbelt, from Florida to California. Of course, the sunbelt is likely to also be the desired location for large solar energy collection systems due to the abundant sunshine.

As a result of the cost and mechanical complexity of existing solar energy collection systems, and the costs associated with constructing the footings to which the support structure is fastened, there has been an unwillingness to proceed with wide-scale solar energy collection systems, despite their obvious advantages in terms of desired environmental effects and conservation of fossil energy sources.

SUMMARY OF THE INVENTION

Accordingly, it is an advantage of the present invention that a structure for supporting energy conversion modules is provided.

It is another advantage of the present invention that a structure for supporting energy conversion modules is provided having a stable geometry that reduces the number of concrete footings.

Another advantage of the present invention is that a structure is provided for supporting energy conversion modules that is mechanically straightforward.

Yet another advantage of the present invention is that a structure is provided that is stable in wind and other weather phenomena.

The above and other advantages of the present invention are carried out in one form by a structure for supporting an array of energy conversion modules above a surface. The structure includes an elongated rigid member, a base coupled to a bottom edge of the rigid member for attachment to the surface, and posts extending from a top edge of the rigid member. The structure further includes torsion tubes, one each of the torsion tubes being pivotally retained by one each of the posts to form parallel rows of the torsion tubes. The torsion tubes are configured for attachment of the energy conversion modules to form the array.

The above and other advantages of the present invention are carried out in another form by a solar energy collection system. The system includes an array of flat, rectangular solar panels and a structure for supporting the solar panels above a surface. The structure includes an elongated rigid member, a base coupled to a bottom edge of the rigid member for attachment to the surface, and posts extending from a top edge of the rigid member. The structure further includes torsion tubes, one each of the torsion tubes being pivotally retained by one each of the posts to form parallel rows of torsion tubes. The torsion tubes are north-south oriented to define a north-south axis, and the solar panels are attached to the torsion tubes to form the array.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows an exploded perspective view of a rigid subassembly utilized to form one of the support assemblies of FIG. 3;

FIG. 5 shows a side view of the rigid subassembly of FIG. 4;

DETAILED DESCRIPTION OF THE PREFERRED EMBODIMENTS

Figure 1:
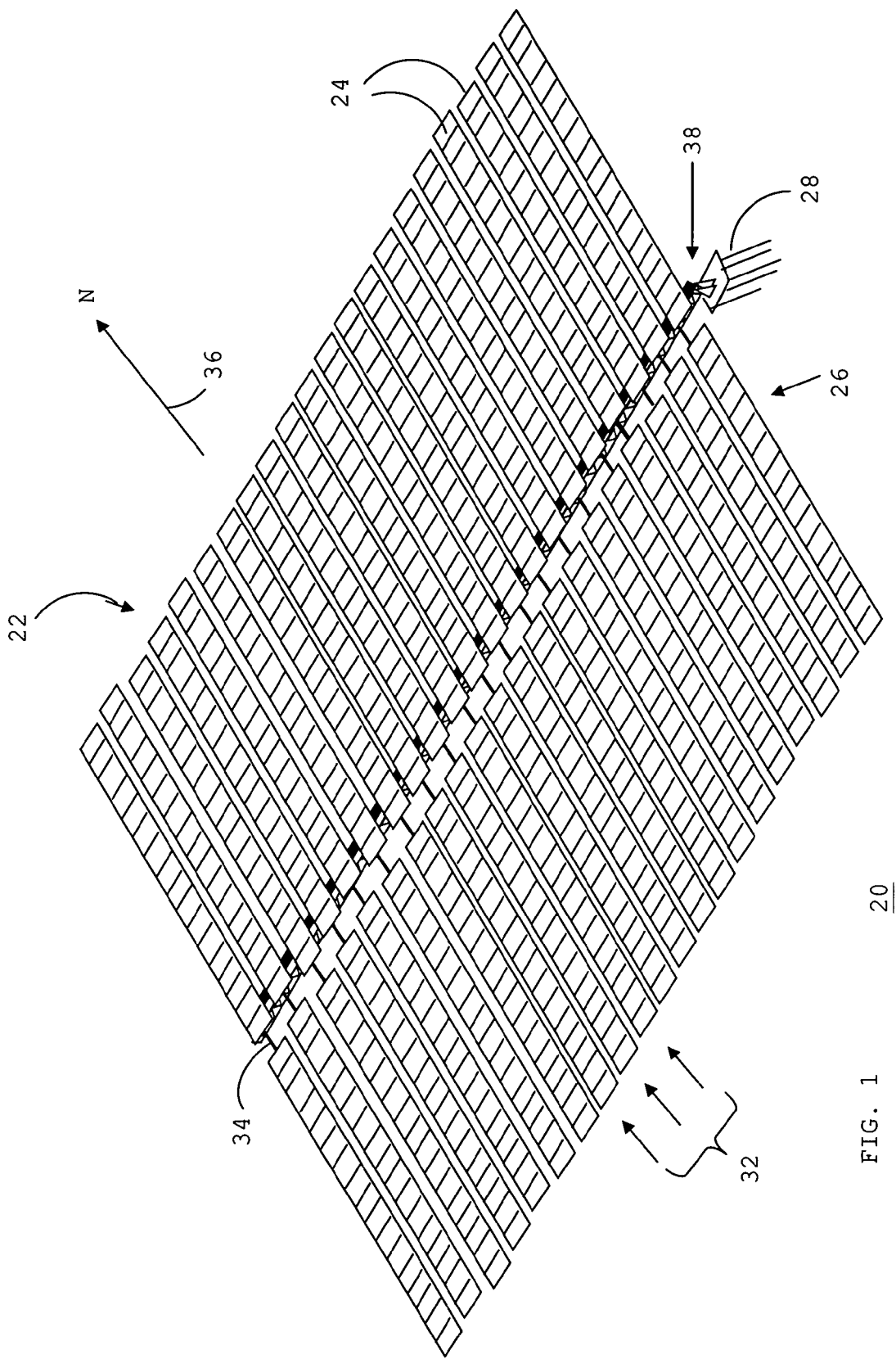
FIG. 1 shows a perspective view of a solar energy collection system for collecting solar energy in accordance with a preferred embodiment of the present invention.

FIG. 1 shows a perspective view of a solar energy collection system 20 for collecting solar energy in accordance with a preferred embodiment of the present invention. Solar energy collection system 20 is a single-axis solar tracking system. A single-axis tracking system represents a reasonable compromise between fixed, non-tracking, systems and multiple-axis tracking systems. That is, a single-axis tracking system achieves the benefit of an increase in efficiency over a fixed system without the undesirable complexity and cost of a multiple-axis tracking system.

System 20 generally includes an array 22 of flat, rectangular energy conversion modules 24 and an underlying support structure 26 for supporting array 22 above a surface 28 of the earth. System 20 moves array 22 of energy conversion modules 24 around a single axis, and therefore approximates tracking of the actual position of the sun.

Each of energy conversion modules 24 incorporates at least one device, e.g., a photovoltaic and/or thermovoltaic cell or a solar panel made using such cells, configured to convert solar energy into electrical energy. For the remainder of this document, energy conversion modules 24 are referred to herein as solar panels 24. However, the use of alternative energy conversion modules 24 does not depart from the spirit of the present invention.

Solar panels 24 are arranged in rows 32, and are supported by torsion tubes 34. In an exemplary embodiment, solar panels 24 are roughly 150 W solar panels that are approximately four feet long. System 20 includes multiple rows 32, in this exemplary case, twenty-one rows 32 of thirty-four solar panels each. Consequently, such a system may be capable of producing over one hundred kilowatts of electricity, thereby making it suitable for commercial and/or industrial applications. However, the present invention is not limited to the specific configuration of solar panels presented herein, but may instead be scaled to accommodate other size panels and/or different quantities of rows 32 and solar panels 24.

Torsion tubes 34 are generally north-south oriented to roughly define a north-south axis 36. However, nothing requires high precision in this orientation. A drive mechanism 38 gradually rotates rows 32 of solar panels 24 throughout the day from an east-facing direction in the morning to a west-facing direction in the afternoon. Rows 32 of solar panels 24 are subsequently brought back to the east-facing orientation for the next day. Although a north-south orientation of torsion tubes 34 is shown, such is not a limitation of the present invention. Alternatively, the present invention may incorporate a seasonal orientation in which torsion tubes 34 are roughly arranged in an east-west orientation and solar panels 24 are rocked in a north-south direction to accommodate seasonal movement of the sun.

System 20 desirably rotates around an axis that is generally horizontal. However, that is not a limitation of the present invention. Alternatively, system 20 may be adapted to rotate around an axis that is tilted on an angle relative to horizontal that corresponds to the latitude of the location. A tilted single-axis tracking structure generally achieves a performance that is improved relative to horizontal single-axis tracking structures because it places the array of solar panels on average closer to perpendicular relative to the path of the sun.

Figure 2:
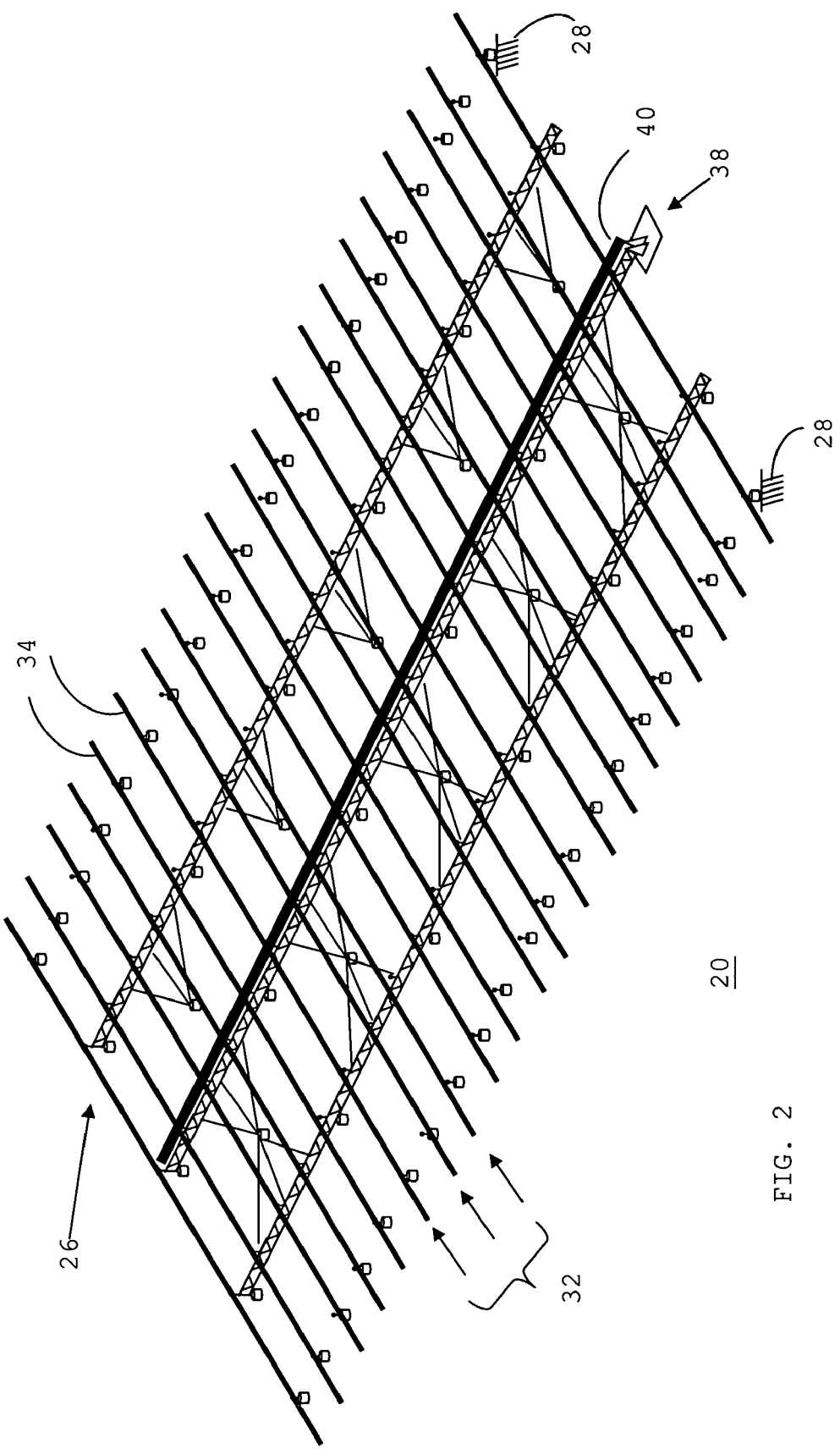
FIG. 2 shows a perspective view of the solar energy collection system with solar panels removed for visualizing the underlying components of the system.

Referring to FIG. 2 in connection with FIG. 1, FIG. 2 shows a perspective view of solar energy collection system 20 with solar panels 24 removed for visualizing the underlying components of system 20. With solar panels 24 removed, support structure 26, torsion tubes 34, and drive mechanism 38 are visible. Drive mechanism 38 is in communication with an actuator 40, and actuator 40 is in communication with torsion tubes 34. Consequently, actuation of drive mechanism 38 enables rotation of torsion tubes 34 via actuator 40 to rotate rows 32 of solar panels 24 from an east-facing direction in the morning to a west-facing direction in the afternoon.

Figure 3:
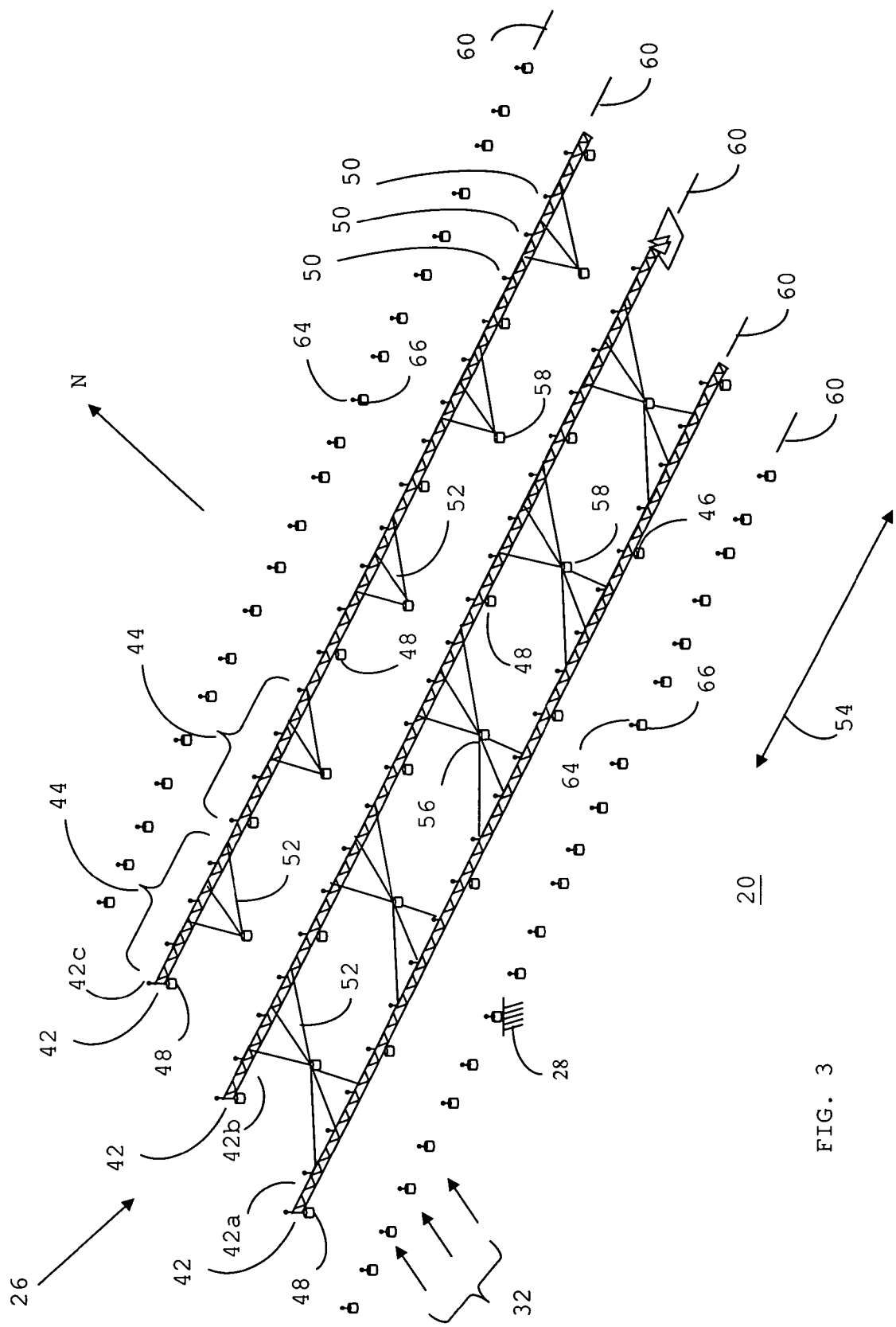
FIG. 3 shows a perspective view of the solar energy collection system with torsion tubes and an actuator removed for visualizing an underlying support structure.

Now referring to FIG. 3 in connection with FIGS. 1-2, FIG. 3 shows a perspective view of solar energy collection system 20 with torsion tubes 34 and actuator 40 removed for visualizing support structure 26. Support structure 26 includes one or more support assemblies 42. In the exemplary embodiment of FIGS. 1-3, system 20 includes three support assemblies 42 in substantially parallel spaced-apart alignment.

Each of support assemblies 42 includes a number of interconnected, rigid subassemblies 44. Each of rigid subassemblies 44 includes a single base 46 (see FIG. 4) that is fastened to a concrete footing 48, and each of rigid subassemblies 44 includes a number of posts 50 to which torsion tubes 34 are coupled. As shown, each subassembly 44 carries four posts 50, each of which pivotally retains one of torsion tubes 34. Thus, one footing 48 is utilized for every four posts 50. This configuration directly contrasts with prior art systems in which separate footings are utilized for each of the posts.

Through the utilization of multiple support assemblies 42 of rigid subassemblies 44, a support structure 26 is provided that is stable in wind. This stability is achieved despite a reduction in quantity of footings 48 relative to prior art configurations. Moreover, rigid subassemblies 44 can be manufactured offsite, rather than at the intended location of system 20, and support assemblies 42 can subsequently be assembled at the intended location of system 20. Consequently, the use of support structure 26 simplifies the construction of system 20 and achieves significant savings in terms of the use of pre-manufactured subassemblies, labor, site preparation, and concrete costs. Although rigid subassemblies 44 are described herein as including four posts 50, this is not a limitation of the present invention. Rather, rigid subassemblies 44 can be adapted to include other quantities of multiple posts 50.

Support structure 26 further includes one or more rigid supports 52 (e.g., stiff rod members) coupled to the top of each of rigid subassemblies 44 and extending away from a longitudinal axis 54 of rigid subassemblies 44. A distal end 56 of each of rigid supports 52 is fixed to a footing 58 in surface 28. Rigid supports 52 limit bowing, or flexure, in the north-south direction, and provide support for resistance to transverse overturning, or wobbling. As shown, rigid supports 52 associated with rigid subassemblies 44 of two adjacent support assemblies 42 may optionally attach to the same footings 58 for economy.

Posts 50 of each of support assemblies 42 are in parallel alignment with one another. That is, posts 50 of a first support assembly 42a, a second support assembly 42b, and a third support assembly 42c are aligned in rows 32 such that three aligned posts 50 pivotally retain one of torsion tubes 34 (FIG. 2).

In a preferred embodiment, each generally horizontal column 60 of support structure 26 is arranged substantially perpendicular to the generally horizontal rows 32 of torsion tubes 34 (FIG. 2), and includes one of support assemblies 42. However, as illustrated in FIG. 3, solar energy collection system 20 may optionally have one or more columns 60 of posts 64 set in individual concrete footings 66 and spaced-apart from support assemblies 42. Outer columns 60 of posts 64 set in individual concrete footings 66 may alternatively be employed to allow easier human access to solar panels 24 as needed. Posts 64 are accordingly aligned with posts 50 in each of rows 32, and pivotally retain torsion tubes 34 (FIG. 2).

Referring to FIGS. 4-5, FIG. 4 shows an exploded perspective view of a one of rigid subassemblies 44 utilized to form one of support assemblies 42 (FIG. 3), and FIG. 5 shows a side view of rigid subassembly 44. As mentioned above, a number of rigid subassemblies 44 are assembled to form one of support assemblies 42. Accordingly, the following discussion applies equally to all rigid subassemblies 44 that make up each of support assemblies 42.

Rigid subassembly 44 includes an elongated rigid member 68 and base 46 coupled to a bottom edge 70 of rigid member 68 for attachment to one of footings 48. Posts 50 extend from a top edge 72 of rigid member 68. Each of posts 50 pivotally retains one of torsion tubes 34, of which only one is shown in partial form. The retaining element of each of posts 50 may be in the form of a ring-shaped collar 74 that loosely retains one of torsion tubes 34, thereby allowing it to pivot in response to actuation via drive mechanism 38 (FIG. 1), discussed below.

In a preferred embodiment, elongated rigid member 68 is a truss, i.e., a framework of straight slender struts connected at joints. Elongated rigid member 68, referred to hereinafter as truss 68, is a simple span with each member designed to carry a tension or compression force. Thus, truss 68 acts like a beam to support multiple torsion tubes 34 on posts 50, and multiple solar panels 24 (FIG. 1). Truss 68 is utilized in a preferred embodiment because it is economically manufactured by multiple commercial vendors and can be readily procured for use within solar energy collection system 20 (FIG. 1). However, those skilled in the art will recognize that other girder structures, such as an I-beam, may alternatively be employed for supporting torsion tubes 34 on posts 50, and solar panels 24.

Rigid subassembly 44 further includes a rigid support 76 that extends from top edge 72 of truss 68 and couples to an outer edge 78 of base 46. Like rigid supports 52, rigid support 76 provides additional support for resistance to transverse overturning, or wobbling, when subassembly 44 is under load. Although support structure 26 is shown as having both rigid supports 52 (FIG. 3) and rigid support 76, support structure 26 may alternatively include either rigid supports 52 or rigid support 76. Furthermore, subassembly 44 may be sufficiently rigid so that neither rigid supports 52 nor rigid support 76 are necessary for providing resistance to transverse overturning.

Rigid subassembly 44 further includes connectors 80 that form the connection between pairs of rigid subassemblies 44 of support assemblies 42 (FIG. 3). Multiple rigid subassemblies 44 may be connected serially to allow additional rows 32 (FIG. 1) of solar panels 24 to be supported by system 20 (FIG. 1).

Figure 6:
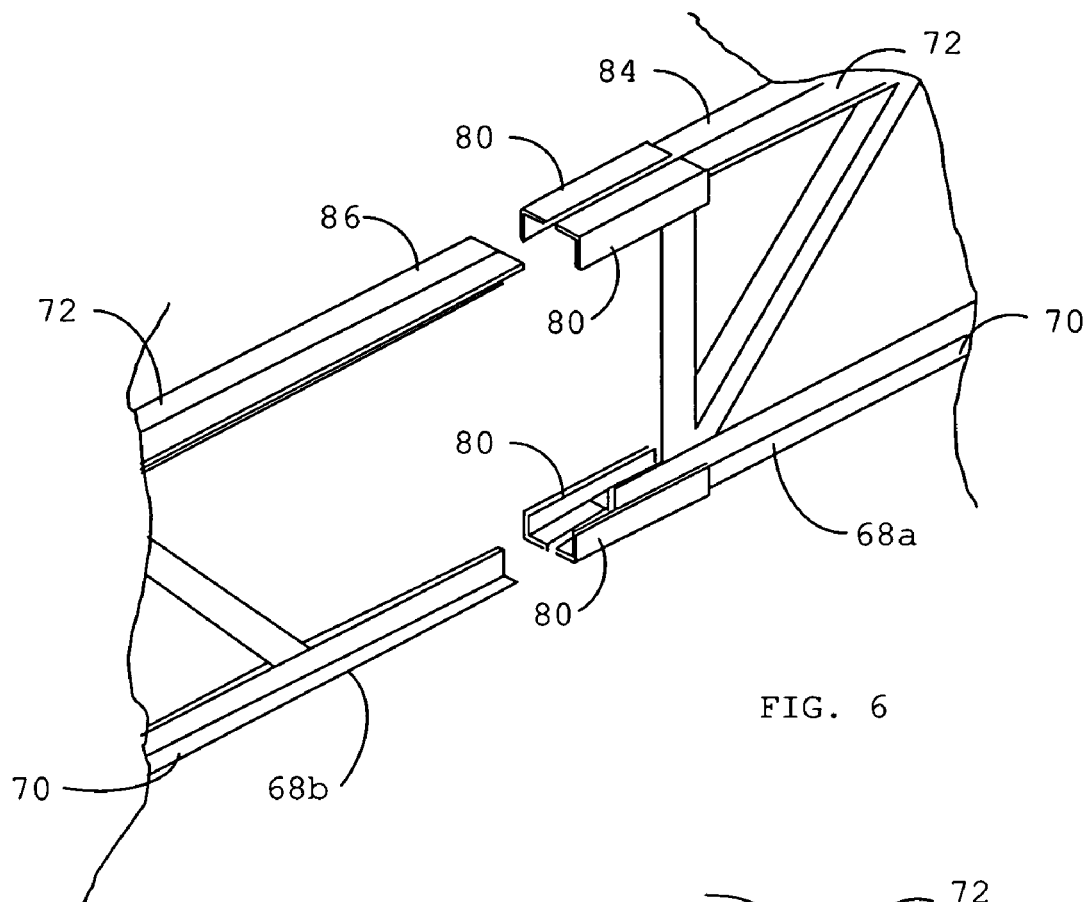
FIG. 6 shows an exploded partial perspective view of connectors used to couple a pair of trusses to form the support assemblies of FIG. 3.
Figure 7:
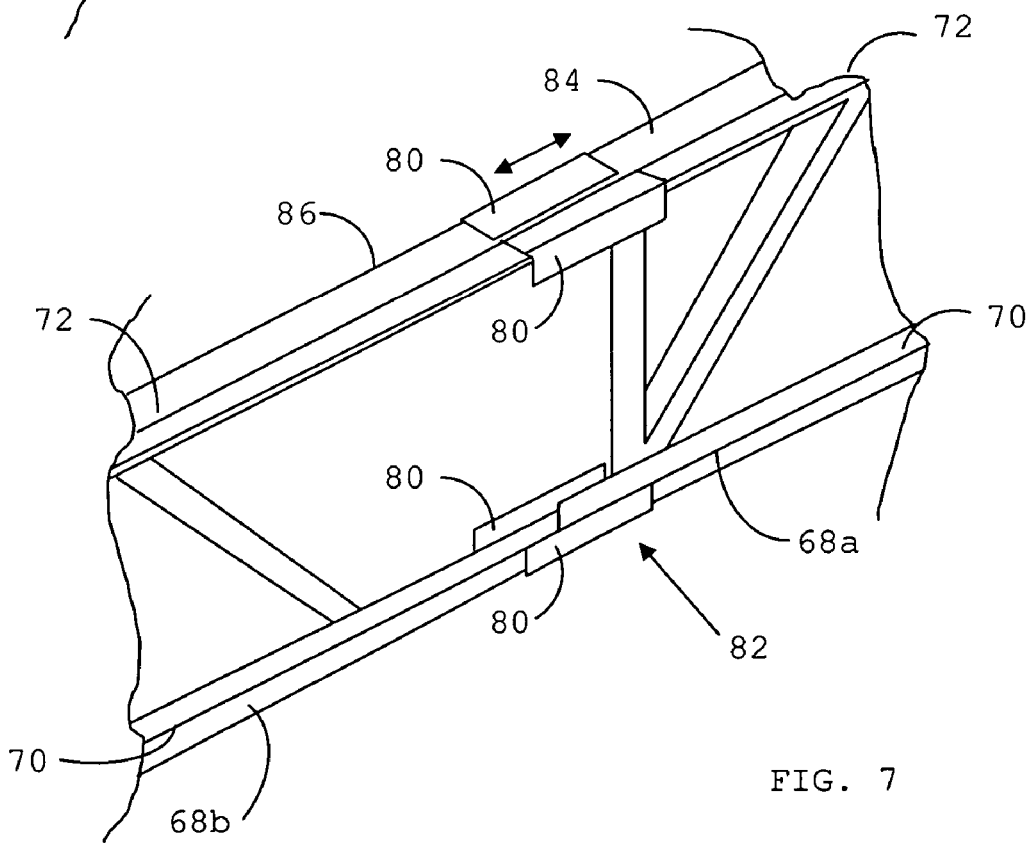
FIG. 7 shows a partial perspective view of a junction between a pair of trusses of a rigid subassembly coupled utilizing the connectors of FIG. 6.

Referring to FIGS. 6-7, FIG. 6 shows an exploded partial perspective view of connectors 80 used to couple a pair of trusses, i.e. a first truss 68a and a second truss 68b, to form one of support assemblies 42 (FIG. 3). FIG. 7 shows a partial perspective view of a junction 82 between a first end 84 of first truss 68a and a second end 86 of second truss 68b utilizing connectors 80.

Base 46 (FIG. 4) is not shown in FIGS. 6-7 for simplicity of illustration. However, it should be understood that base 46 will be coupled to bottom edge 70 of one of first and second trusses 68a and 68b proximate junction 82. Similarly, one of posts 50 (FIG. 4) coupled to top edge 72 of one of first and second trusses 68a and 68b, and generally vertically aligned with base 46, is not shown in FIGS. 6-7 for simplicity of illustration.

In an exemplary embodiment, each of connectors 80 is formed of angle iron, i.e., a metal strip of iron or steel bent to form a right angle. Connectors 80 are fixedly coupled to one of first and second trusses 68a and 68b, respectively, and are slidably coupled to the other of first and second trusses 68a and 68b. By way of example, each of four connectors 80 is welded to first end 84 of first truss 68a, and each of connectors 80 overlaps and slides along second end 86 of second truss 68b. This slideable coupling of connectors 80 between first and second trusses 68a and 68b, respectively, at junction 82 serves to accommodate thermal expansion, i.e., any increase in dimensions of first and second trusses 68a and 68b as a result of an increase in temperature while preventing vertical movement. Utilizing four connectors 80 and positioning them on four opposing corners of first and second ends 84 and 86 of respective first and second trusses 68a and 68b ensures that first and second trusses 68a and 68b are retained parallel and in serial alignment relative to one another despite thermal expansion induced movement.

Connectors 80 manufactured from angle iron are advantageously utilized due to their ready availability, simplicity, and low cost. However, the use of angle iron for the use of connectors 80 is not a limitation. Those skilled in the art will recognize that alternative connectors may be employed in which one portion of the connector is fixed to one of first and second trusses 68a and 68b, respectively, and another portion of the connector is allowed to slide relative to the other of first and second trusses 68a and 68b in response to thermal expansion.

Figure 8:
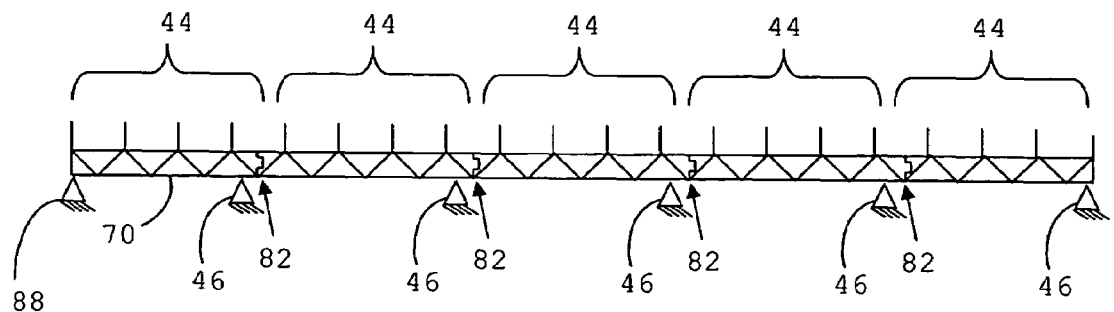
FIG. 8 shows a side schematic view of one of the support assemblies that includes five of the rigid subassemblies of FIG. 4.

FIG. 8 shows a side schematic view of one of support assemblies 42 that includes five interconnected rigid subassemblies 44. Since each of subassemblies 44 includes only one base 46, an additional base 88 should be coupled to bottom edge 70 of an end most one of subassemblies 44.

Alternatively, a support section (described in connection with FIG. 9) may be coupled to an end of second support assembly 42b in lieu of additional base 88. Each of rigid subassemblies 44 includes four posts 50 for pivotally retaining torsion tubes 34 (FIG. 2). Consequently, interconnection of multiple rigid subassemblies 44 enables the formation of additional rows 32 (FIG. 2) of torsion tubes 34 all of which are substantially parallel to one another.

Figure 9:
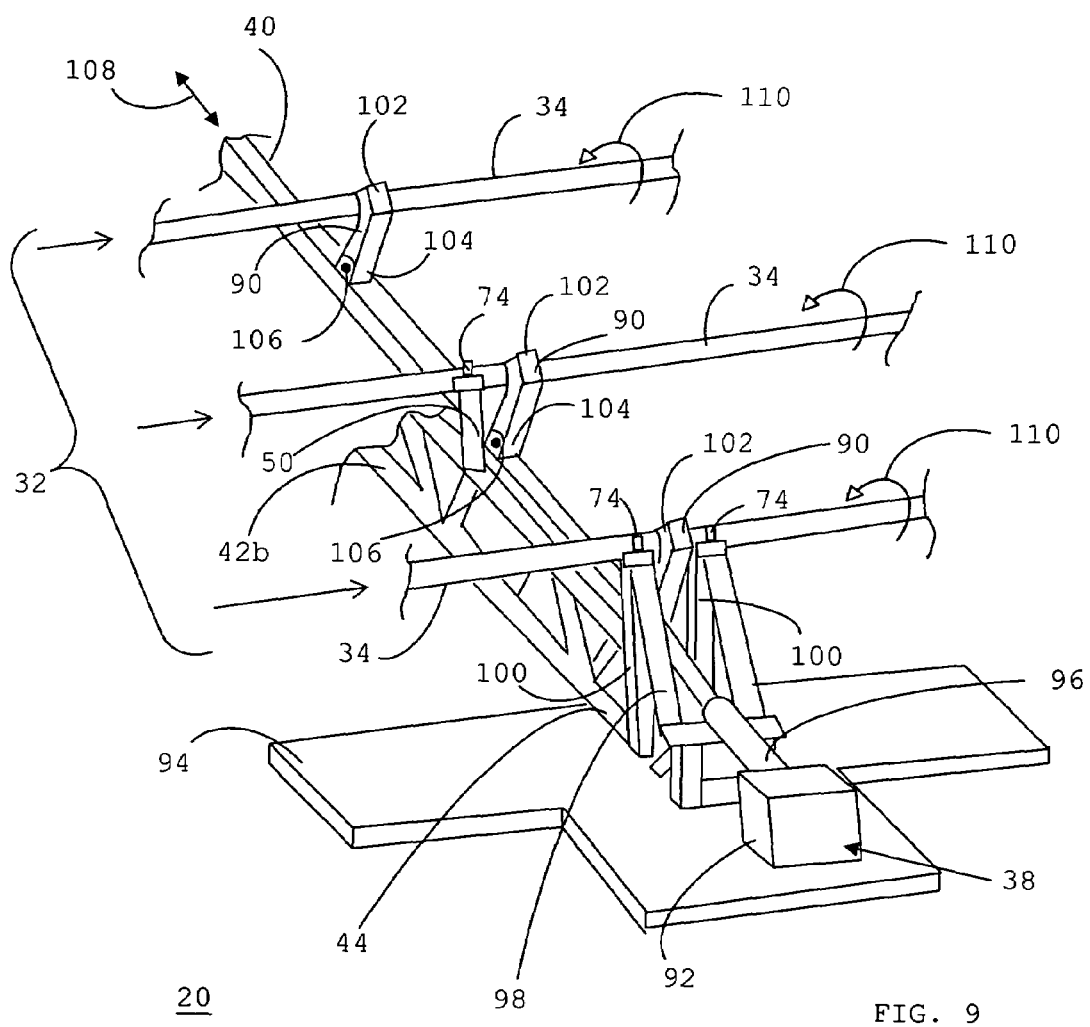
FIG. 9 shows a partial perspective view of the solar energy collection system of FIG. 1 including a drive mechanism, an actuator, and torque arms for enabling rotation of torsion tubes of the system.

FIG. 9 shows a partial perspective view of solar energy collection system 20 including drive mechanism 38, actuator 40, and torque arms 90 for enabling rotation of torsion tubes 34. FIG. 9 further shows actuator 40 positioned proximate second support assembly 42b, of which only a portion is shown, and oriented generally parallel to second support assembly 42b.

Drive mechanism 38 includes a body 92 configured for attachment to a foundation 94 and a rod member 96 extendible from body 92. A support section 98 is also configured for attachment to foundation 94. Support section 98 includes a pair of posts 100, each of which has ring-shaped collar 74 coupled thereto for pivotally retaining one of torsion tubes 34. Posts 100 establish a first one of rows 32 of array 22 (FIG. 1), and are aligned with posts 50 and posts 64 of other columns 60 of support structure 26, as described in connection with FIG. 3. Support section 98 additionally provides an attachment point for a first one of rigid subassemblies 44 of second support assembly 42b.

Each of torque arms 90 includes a first arm end 102 that non-pivotally supports one of torsion tubes 34. More specifically, first arm end 102 of each of torque arms 90 is in fixed engagement with one of torsion tubes 34. In contrast, actuator 40 pivotally supports a second arm end 104 of each of torque arms 90. That is, each of torque arms 90 is enabled to pivot about a flexible connection 106, such as a pivot, hinge, or the like, formed between actuator 40 and second arm end 104.

Actuator 40 is in communication with rod member 96 such that extension or retraction of rod member 96 relative to body 92 moves actuator 40 to enable rotation of each of torsion tubes 34 via torque arms 90. More specifically, collars 74 of posts 50 (only one of which is visible) and collars 74 of posts 100 pivotally retain torsion tubes 34, but torsion tubes 34 do not pivot relative to first arm end 102 of torque arms 90. Consequently, forward/backward linear movement of actuator 40, as represented by a bi-directional arrow 108, yields corresponding pivotal, or rotational, movement of torsion tubes 34, as represented by an arrow 110. Since solar panels 24 (FIG. 1) are fixedly coupled to torsion tubes 34, pivoting movement 110 of torsion tubes 34 rotates rows 32 of solar panels 24.

Drive mechanism 38 drives array 22 (FIG. 1) of solar panels 24 by a single generally horizontal linear actuator 40. A variety of mechanisms may be employed to form drive mechanism 38, such as hydraulic cylinder, a screw-type mechanism, and so forth. This single drive mechanism 38 is thus capable of moving all rows 32 (FIG. 1) of array 22 from an east-facing direction in the morning to a west-facing direction in the afternoon. In the embodiment described above, drive mechanism 38 is desirably capable of applying more than 50,000 pounds of force to move and/or hold array 22 in windy conditions. However, drive mechanism 38 may be alternatively configured to apply an appropriate amount of force in accordance with the particular size and configuration of a different array of solar panels. Drive mechanism 38 may be actuated by a timer that causes rod member 96 to extend or retract in response to the time of day. Alternatively, drive mechanism 38 may be in communication with a light sensor which actuates drive mechanism 38 in response to the direction of the sunlight.

Figure 10:
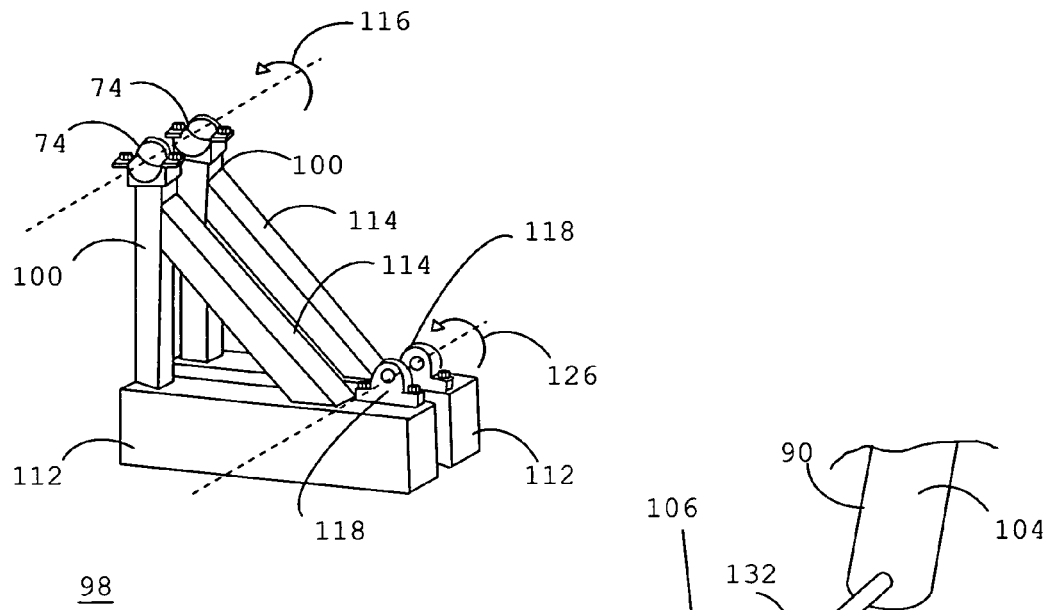
FIG. 10 shows a perspective view of a support section of the solar energy collection system.

FIG. 10 shows a perspective view of support section 98 of solar energy collection system 20 (FIG. 1). As discussed briefly above, support section 98 attaches to foundation 94 (FIG. 9). Support section 98 includes a pair of base members 112 upon which posts 100 are affixed. Braces 114 provide additional support for posts 100. In an exemplary embodiment, posts 100 are generally rectangular in cross-section for ready attachment of one of rigid subassemblies 44 (FIG. 4), although such a shape is not a limitation of the present invention. A first pivot axis 116 is positioned at ring-shaped collars 74 mounted on posts 100. First pivot axis 116 represents pivotal movement 110 of torsion tubes 34 (FIG. 9).

Support section 98 further includes an eye section 118 mounted on each of base members 112. Eye section 118 pivotally supports rod member 96 (FIG. 9), thereby enabling pivotal coupling between rod member 96 and body 92 (FIG. 9) of drive mechanism 38 (FIG. 9) about a second pivot axis 126. Thus, rod member 96 is pivotally retained between braces 114. As rod member 96 extends from or retracts toward body 92, rod member 96 is allowed to pivot about second pivot axis 126 to accommodate vertical movement of actuator 40 (discussed below).

Figure 11:
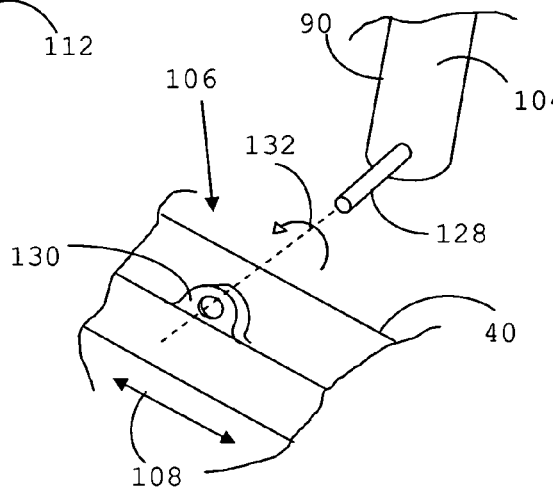
FIG. 11 shows a perspective view of a flexible connection between an actuator and a torque arm of the solar energy collection system.

FIG. 11 shows a perspective view of flexible connection 106 between actuator 40 and second arm end 104 of one of torque arms 90 of solar energy collection system 20 (FIG. 1). FIG. 11 illustrates only one flexible connection 106. However, the following discussion applies equally to each of flexible connections 106 between actuator 40 and each of torque arms 90. In a preferred embodiment, second arm end 104 of each of torque arms 90 includes a pin member 128. Actuator 40 includes a plurality of eye sections 130. Flexible connection 106 is established by directing pin member 128 through eye section 130. Pin member 128 is preferably pivotally retained in eye section 130 utilizing a fastener (not shown) such as a cap nut, a cotter pin, and the like known to those skilled in the art. The pivoting retention of pin member 128 in eye section 130 yields a robust flexible connection 106 about a third pivot axis 132 for translating linear movement 108 of actuator 40 to pivotal movement of torsion tubes 34 (FIG. 1).

Figure 12:
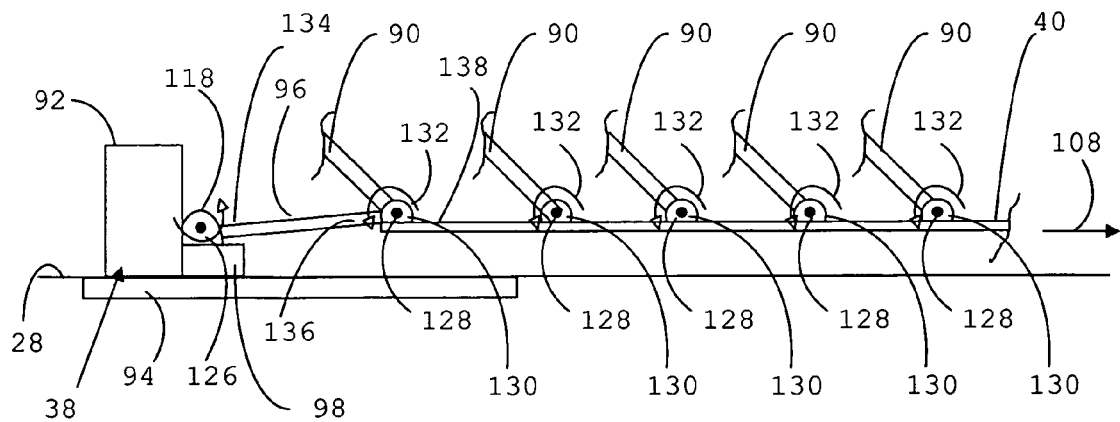
FIG. 12 shows a partial side schematic view of a drive mechanism interconnected with the actuator and a number of torque arms of the solar energy collection system.

FIG. 12 shows a partial side schematic view of drive mechanism 38 interconnected with actuator 40 and a number of torque arms 90 of solar energy collection system 20. In a preferred embodiment, actuator 40 is a non-articulating element. More specifically, actuator 40 may be a single elongated member or a series of linked members that are not allowed to articulate relative to one another so that actuator is rigid along its entire length. This rigid configuration of actuator 40 resists binding as actuator 40 moves, as opposed to prior art articulated systems.

As further shown in FIG. 12, a proximal end 134 of rod member 96 pivotally couples to body 92 at eye section 118 of support section 98. In addition, a distal end 136 of rod member 96 pivotally couples to each of actuator 90, and an actuator end 138 of actuator 40 at a first one of eye sections 130 on actuator 40 via an associated one of pin members 128. Thus, rod member 96 is further able to pivot relative to actuator 40. Pivoting action of rod member 96 at second pivot axis 126 and third pivot axis 132 allows vertical adjustment of rod member 96, while maintaining actuator 40 in a generally horizontal orientation relative to surface 28.

In summary, the present invention teaches of a single axis tracking structure for supporting energy conversion modules, such as solar panels. The structure includes a number of spaced-apart support assemblies that in turn include a number of interconnected rigid truss subassemblies. This rigid structure yields a support structure having a geometry that is stable in wind and other weather phenomena. Moreover, the rigid structure enables a reduction in the number and size of concrete footings to which the structure is attached. A reduction in the number and size of concrete footings significantly drives down the costs associated with constructing the footings to which the support structure is fastened. In addition, the actuator linkage and single drive mechanism for concurrently pivoting all solar panels of an array is mechanically straightforward, thereby reducing manufacturing, assembly, and maintenance costs of the support structure. The reduction in concrete requirements and the mechanical simplicity of the support structure may greatly assist in the expansion of wide-scale solar energy collection systems.

Although the preferred embodiments of the invention have been illustrated and described in detail, it will be readily apparent to those skilled in the art that various modifications may be made therein without departing from the spirit of the invention or from the scope of the appended claims. For example, the quantity and size of the solar panels may vary from that which is shown, thereby affecting the number and size of the support assemblies of the support structure.

What is claimed is:

1. A structure for supporting an array of energy conversion modules above a surface comprising:
   an elongated rigid member;
   a base coupled to a bottom edge of said rigid member for attachment to said surface;
   posts extending from a top edge of said rigid member;
   torsion tubes, one each of said torsion tubes being pivotally retained by one each of said posts to form parallel rows of said torsion tubes, said torsion tubes being configured for attachment of said energy conversion modules to form said array;
   a drive mechanism having a body and a rod member extendible from said body;
   torque arms, a first arm end of one each of said torque arms non-pivotally supporting one each of said torsion tubes; and
   an actuator pivotally supporting a second arm end of said each of said torque arms and in communication with said rod member such that extension of said rod member from said body moves said actuator to enable rotation of said torsion tubes, via said torque arms.

2. A structure as claimed in claim 1 wherein said elongated rigid member comprises a truss.

3. A structure as claimed in claim 1 wherein said rigid member is a first rigid member, said base is a first base, said posts are first posts, said torsion tubes are first torsion tubes, and said structure further comprises:
   a second elongated rigid member having a second end coupled with a first end of said first rigid member;
   a second base coupled to a second bottom edge of said second rigid member for attachment to said surface;
   second posts extending from a second top edge of said rigid member; and
   second torsion tubes, one each of said second torsion tubes being pivotally retained by one each of said second posts to form additional parallel rows of said second torsion tubes that are substantially parallel to said parallel rows of said first torsion tubes, said second torsion tubes being configured for attachment of additional ones of said energy conversion modules.

4. A structure as claimed in claim 3 further comprising a connector coupled to one of said first end of said first rigid member and said second end of said second rigid member, and said connector being slidably coupled with the other of said first end of said first rigid member and said second end of said second rigid member.

5. A structure as claimed in claim 1 wherein said rigid member is a first rigid member, said base is a first base, said posts are first posts, and said structure further comprises:
   a second elongated rigid member in substantially parallel, spaced-apart alignment with said first rigid member;
   a second base coupled to a second bottom edge of said second rigid member for attachment to said surface; and
   second posts extending from a second top edge of said second rigid member, said second posts being in parallel alignment with said first posts and pivotally retaining said torsion tubes.

6. A structure as claimed in claim 1 further comprising a rigid support extending from said top edge of said elongated rigid member and coupled to an outer edge of said base.

7. A structure as claimed in claim 1 further comprising a rigid support coupled to said elongated rigid member and extending away from a longitudinal axis of said elongated rigid member, said rigid support having a distal end fixed to said surface.

8. A structure as claimed in claim 1 wherein said body is configured for attachment to said surface.

9. A structure as claimed in claim 1 wherein a first end of said rod member pivotally couples to said body.

10. A structure as claimed in claim 1 wherein a second end of said rod member pivotally couples to said actuator.

11. A structure as claimed in claim 1 wherein:
    said actuator comprises a plurality of eye sections; and
    said second arm end of said each of said torque arms comprises a pin member, said pin member interfacing with one of said plurality of eye sections.

12. A structure as claimed in claim 1 wherein said actuator is in substantially parallel alignment with said elongated rigid member.

13. A structure as claimed in claim 1 wherein said elongated rigid member is positioned proximate said actuator.

14. A structure as claimed in claim 1 wherein said actuator is a non-articulating element.

15. A structure as claimed in claim 1 wherein said surface is a foundation and said structure further comprises a support section coupled to a first end of said elongated rigid member, said support section and said body of said drive mechanism being coupled to said foundation.

16. A structure as claimed in claim 15 wherein a first one of said posts is coupled to a top of said support section, and a first one of said torsion tubes is retained by said first pier.

17. A structure as claimed in claim 15 wherein said support section includes a pivot section for pivotal attachment of said rod member.

18. A structure as claimed in claim 15 wherein said base is located proximate a second end of said elongated rigid member.

19. A structure as claimed in claim 1 wherein said energy conversion modules are flat, rectangular solar panels, and said torsion tubes are north-south oriented to define a north-south axis.

* * * * *